United States Patent [19]

Danzey, Jr.

[11] 4,172,162
[45] Oct. 23, 1979

[54] BORIDE HARD-FACING

[75] Inventor: Lee B. Danzey, Jr., Arlington, Mass.

[73] Assignee: Materials Development Corporation, Medford, Mass.

[21] Appl. No.: 699,941

[22] Filed: Jun. 25, 1976

[51] Int. Cl.² .............................................. C23F 7/00
[52] U.S. Cl. ........................................ 427/225; 148/6; 148/24; 148/26; 427/223
[58] Field of Search ................... 427/225, 223, 248 R; 428/457; 148/24, 26, 6, 31.5, 6.11, 6.3; 219/146; 75/123 B; 29/183.5

[56] References Cited

U.S. PATENT DOCUMENTS

| | | | |
|---|---|---|---|
| 1,708,815 | 4/1929 | Wille | 219/146 |
| 2,295,702 | 9/1942 | Wissler | 427/225 |
| 2,613,304 | 10/1952 | Colinet | 148/24 |
| 2,701,779 | 2/1955 | Conn | 148/24 |
| 2,725,287 | 11/1955 | Cronin | 148/24 |
| 3,024,109 | 3/1962 | Hoppin et al. | 75/170 |
| 3,101,274 | 8/1963 | Beyerstedt et al. | 427/225 |
| 3,147,362 | 9/1964 | Ramsey et al. | 219/146 |
| 3,429,753 | 2/1969 | Wagner | 148/6 |
| 3,471,310 | 10/1969 | Joseph et al. | 427/225 |
| 3,476,529 | 11/1969 | Dubin | 29/183.5 |
| 3,508,977 | 4/1970 | Basche | 148/6.11 |
| 3,549,424 | 12/1970 | Rice | 148/6.3 |
| 3,554,791 | 1/1971 | Johnson et al. | 148/24 |
| 3,573,426 | 4/1971 | Blake et al. | 219/146 |
| 3,574,649 | 4/1971 | Ianti et al. | 427/248 R |
| 3,645,782 | 2/1972 | Johnson | 148/26 |
| 3,666,436 | 5/1972 | Brecks et al. | 75/170 |

*Primary Examiner*—Ronald H. Smith
*Assistant Examiner*—Janyce A. Bell
*Attorney, Agent, or Firm*—Cesari & McKenna

[57] ABSTRACT

Introduction of boron as a hardening agent for metal hard-facing and the like is achieved by way of welding practices involving a consumable slender rod or wire filler member of relatively ductile material into the surface of which boron has been diffused to leave relatively brittle boride about a relatively ductile core, the slender borided welding filler member lending itself to uncomplicated handling because of core ductility while at the same time exhibiting a high percentage of borided material from which a hard facing can be developed when it is melted and bonds with metal of a body which is to be hard-faced.

3 Claims, 8 Drawing Figures

U.S. Patent  Oct. 23, 1979  4,172,162
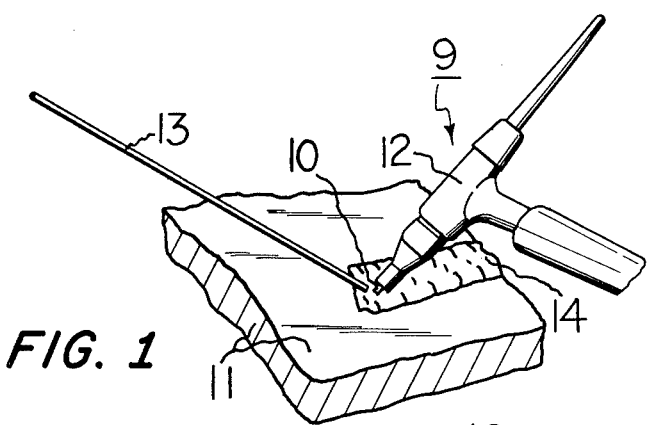
FIG. 1
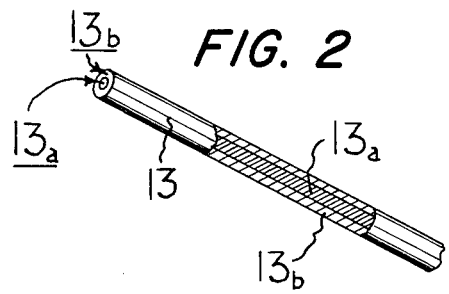
FIG. 2
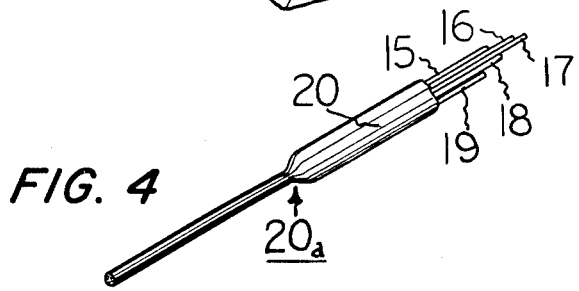
FIG. 4
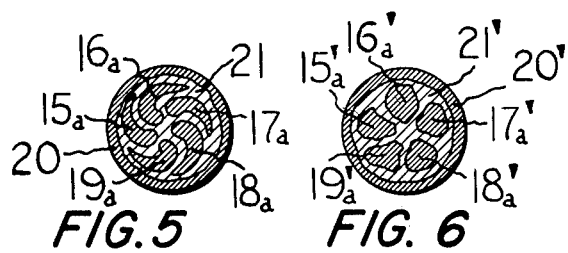
FIG. 5
FIG. 6
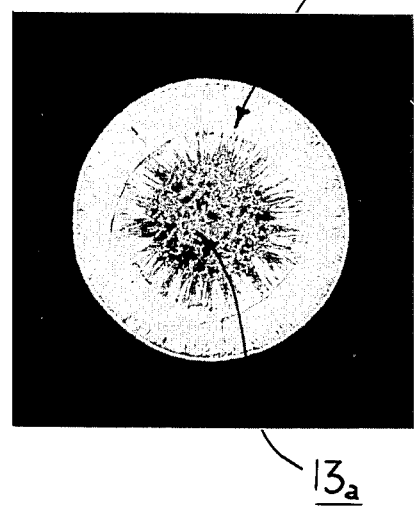
FIG. 3
FIG. 7
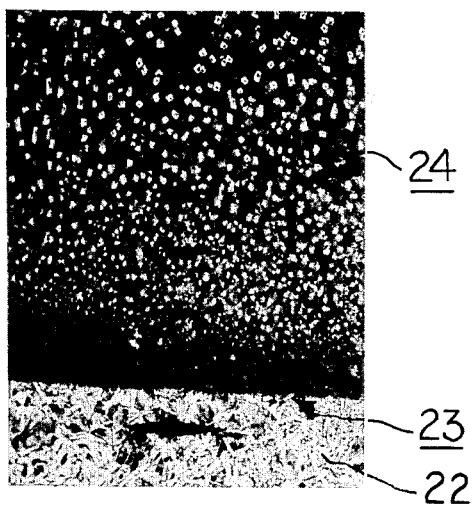
FIG. 8
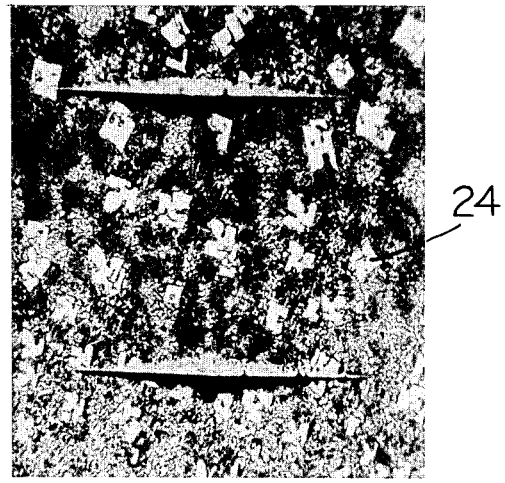

BORIDE HARD-FACING

BACKGROUND OF THE INVENTION

The present invention relates to improvements in the hard-facing of metal parts by forming borides thereon through welding-type melting of surface-borided filler members, and, in one particular aspect, to novel and improved hard-facing and the like wherein torch-melted filler rods or wires are of relatively ductile metal into which boron has been diffused to leave relatively brittle boride about a relatively ductile core.

It has been well known that conversion of surfaces of a body metal, such as iron, to borides (for example, FeB, $Fe_2B$) can result in the formation of exteriors which are relatively hard and offer improved resistances to wear and to certain corrosives. Such conversions may result from reactions with the body metal which leave the shaping and finish essentially unchanged, but it has also been well known to harden and/or restore worn members via added-on layers or cladding of such materials. Using the latter techniques, it has been possible to hard-face worn parts conveniently at job sites, and to take advantage of toughness and economy of common alloys in fabricating bulky items which need be hard only along wear surfaces. Hard-facing involves a build-up of the wear-resistant material through melting and filling with the aid of a generally conventional welding torch and a filler rod or wire of the hardening material.

The embrittling effects which follow along with the hardening developed by boron in various metals has led to powder-metallurgy practices, wherein boride particles have been bonded together to form larger masses, such as are described in U.S. Pat. Nos. 1,913,373 and 1,913,100 and 1,968,067. Alloys with boride filaments to enhance hardness are also known, as is described in U.S. Pat. No. 3,507,632. Brazing alloy paste including boron is discussed in U.S. Pat. No. 3,024,109, where the effects of boron upon melting temperatures are recognized, and protective coatings are described in U.S. Pat. No. 3,666,436 where the particulated mixture used to produce the coatings include borides. Diffusion-bonding of members, with the aid of boronized layers, has been discussed in a number of U.S. Pat. Nos. including 3,197,858 and 3,339,269 and 3,678,570 and 3,753,794; however, the objectives and techniques there will be seen to be different from those of the hard-facing with which the present invention is concerned.

Although one may attempt to use powdered borides, in compacted forms, as fillers in welding-type hard-facing operations, there is a tendency for such particulate materials to separate and result in facings which are non-uniform; in addition, the borides which have been compacted or cast into the form of slender filler rods tend to be difficult to handle because of their brittleness, and that characteristic prevents their being used in substantial lengths or coiled in spools for automatic or continuous feeding.

SUMMARY

By way of a summary statement as to practice of this invention in one of its aspects, an elongated member of ductile metal, intended as a filler for use in a welding-type hard-facing of a metal body, is partly converted to boride fully about its periphery, with the core being left unreacted and therefore in its relatively ductile natural state. The depth of bronizing is that which will result in a percentage of boron in the remaining metal which is about that desired for a hard-facing of the body, and the hard-facing itself is accomplished with the aid of TIG (tungsten inert gas) welding equipment which surface-melts the body material and bonds the molten boronized filler rod material with it as an overlay or facing.

A relatively thin continuous wire, boronized only to a small depth near its surface and ductile centrally, may be coiled for convenient handling and for continuous feed during hard-facing operations, despite the fact that its borided exterior surfaces may be exceedingly brittle. Relatively thick filler members offering large amounts of boride, without flaking during handling or separating badly during melting, are formed by bundling thinner wires together within a tube or sheath of the base material and then swaging or drawing the assembly down to a relatively small diameter, such that all borides are locked within the sheath until melting occurs during a hard-facing operation.

Accordingly, it is one of the objects of the present invention to improve hard-facing by introducing boron via surface-borided filler members in which unreacted parent metal is maintained as core to preserve overall ductility of the member and to yield desired percentages of boride and parent metal in hard-facing overlays.

It is also an object of this invention to provide unique and advantageous hard-facing overlay filler rod and wire from which borides may be derived for overlays and in which borides are present at surface regions bordering relatively ductile cores.

Although the features of this invention which are considered to be novel are expressed in the appended claims, further details as to preferred practices, as well as to further objects and advantages, may be most readily comprehended through reference to the following description taken in connection with the accompanying drawings.

BRIEF DESCRIPTION OF THE DRAWINGS

FIG. 1 is a perspective pictorial view of TIG welding apparatus being employed in a hard-facing operation aided by a surface-borided filler member in accordance with the present invention;

FIG. 2 depicts an improved surface-borided hard-facing filler member, with a portion being cross-sectioned to illustrate brittle exterior and ductile core portions;

FIG. 3 is a photographic enlargement of a transverse cross-section of a surface-borided steel filler member like that of FIG. 2;

FIG. 4 represents pictorially a composite hard-facing filler rod formed by a bundle of surface-borided wires within a tube which is swaged or drawn to a reduced diameter;

FIG. 5 is an enlarged cross-section of a swaged and rolled portion of a composite rod such as that of FIG. 4;

FIG. 6 is an enlarged cross-section of a swaged portion of a composite rod such as that of FIG. 4;

FIG. 7 is a 90× magnification of a cross-sectioned portion of a hard-faced body, showing both the base and overlay materials and hardness indentations; and FIG. 8 is a 490× magnification of a cross-sectioned portion of the overlay material of the same hard-faced body.

DESCRIPTION OF THE PREFERRED EMBODIMENTS

As appears in FIG. 1, apparatus suitable for fashioning improved hard-facing overlays on a metal body is generally like that used in so-called TIG (tungsten inert gas) welding, and involves a tungsten-arc torch 9 having a non-consumable electrode 10 which maintains an electric arc with the base or body material 11 under shielding by an inert gas fed through the electrode holder 12. In hard-facing operations, the torch serves to bring the surface of body material 11 in its immediate area up to melting temperature, and a hard-facing "filler" rod 13 is also melted by the torch and is spread over the molten surface of body 11 to form a hard overlay deposit 14. Preferably, the melted rod material is not fully mixed with and diluted by the body material, but, instead, bonds primarily at the surface of the body material and forms the layer 14 which is essentially the material from the melted rod alone. In some instances, a desired height and refinement of the composition of the overlay is obtained by creating the overlay in several "passes", one layer over another. The overlay deposit may be of broad area, completely covering outer surfaces of a body which is of low-cost material and either does not require or should not exhibit hardness throughout its bulk.

Boronizing imparts highly desirable surface-hardening effects upon certain metals and alloys, but has best been performed under factory-controlled conditions; in addition, such surface-hardening does not build up an overlay which can compensate for material losses due to wear or the like. Boronizing techniques for creating such surface-hardening are referred to in the aforementioned U.S. Pat. Nos. 3,339,269 and 3,753,794, for example. Unfortunately, the borides produced are very brittle, and they therefore do not lend themselves well to fabrication or used in the preferred forms of elongated rods or wires which can be fed continuously into broad-area regions being metal-faced. Moreover, the percentage of boride, in relation to some parent metal, should be readily controllable to allow the facing to have the properties desired, whereas "filler" members of cast or compacted borides alone would yield uncertain concentrations in the facing. The filler member or rod, 13, is therefore of a unique form wherein its center or core, 13a, is substantially unreacted with boron while the annular region 13b around that core has been boronized thoroughly and consists essentially of borides; those relationships are observable in FIGS. 2 and 3, the irregular interfacing which tends to maintain the boride locked with the core being evident in FIG. 3. The rod or wire form in which the member 13 is to be produced presents no significant problems prior to the boriding, because the stock is then simply of a metal which can be expected to possess ductility adequate to permit shaping and handling. Iron-base, nickel-base and cobalt-base alloys such as are already known to be hardened usefully by boronizing represent examples of materials which may be fashioned into such filler members. Thereafter, boron is added through a surface diffusion treatment, but the boriding is not extended through the central core, such that the core retains ductility enabling the hard-surfaced member to be handled conveniently in long lengths without breaking. Preferably, desired percentages, by weight, of boron and of the parent metal per unit length of the elongated rod or wire, are determined in advance, it being known that the hard-facing will have about the same composition as that of the filler member. The percentage of boride in relation to parent metal is controlled by boriding the rod or wire stock to appropriate depth. Temperatures encountered in hard-facing welding-type operations do not develop reactions which would detrimentally affect boron available to the hard-facing; instead, the melting will cause boron which was concentrated in boride near the exterior of the filler member to become quite uniformly distributed in boride dispersed throughout the hard-facing overlay. Accordingly, the facing tends to exhibit desirably uniform hardness as induced by the boron.

In the filler member whose cross-section appears in photographic enlargement in FIG. 3, the parent material, and unreacted core 13a, is so-called 1020 steel, a low carbon steel including 0.2% carbon and the balance substantially pure iron. With the surface diffusion of boron, forming the boride exterior 13b, that member includes about 9.16% boron. When such a filler member is melted and bonded with the molten surface of a low-carbon steel body, such as the body 11 in FIG. 1, the result is a relatively hard overlay or integral cladding, 14, having essentially the same boron content, namely about 9.16%.

Although rods and wires such as member 13 can be expected to remain intact during such handling and bending as would be likely to break or flake cast or compacted boride members, extremes of physical deformations and encounters may damage even these, particularly where the percentage of boron must be high and little ductile core material remains. In those instances, the composite arrangements illustrated in FIGS. 4–6 can be employed, with a group of relatively-thin borided wires being enclosed within a ductile-metal sheath. As is shown in FIG. 4, several relatively-thin wires, 15 through 19, each surface-borided and each having a parent-metal core which remains to facilitate handling, are bundled together within a thin-walled metal tube 20, and the wire-filled tube is then reduced in cross-section, at region 20a, by conventional techniques such as those involving swaging, rolling and/or drawing. Each of wires 15 through 19 is initially like member 13, with boride clinging integrally with its ductile core, but, upon drastic reduction of the cross-section of tube 20 and the bundled wires within it, all interstices between the bundled wires and the inside of the tube are eliminated and the borided portions are crushed and densely compacted. Having reference to FIG. 5, for example, wherein the cross-section is that of the FIG. 4 tube 20 after mechanical working had compacted the assembly, it was found that the ductile-material wire cores, 15a through 19a had become somewhat flattened and curved from their original generally-circular cross-sectional configuration, and that the borides which had been formed independently about each of those cores had become crushed and compacted as a single mass, 21, filling the remaining spaces within the tube or sheath 20. The latter tube had of course been reduced both in cross-section and diameter as the result of swaging and rolling, the final outside diameter being only about 3/32 inch. A like composite appears in the FIG. 6 cross-section, wherein the cores of the five wires remain generally circular after a reduction which did not involve heavy rolling; the same reference characters are used to designate components functionally or physically like those depicted in FIG. 5, with distinguishing single-prime accents being added. Each of the wires 15–19, and the tube or sheath 20, may be of a metal known to be suitable as the parent metal for metal-facing and, in the case of the wires, known also to admit of the needed boronizing, such as a low-carbon steel. In the finished assembly, the percentage of boron to parent metal is of course controlled by such factors as the depths to which the wires have been diffused to form the borides, and by the wall thickness remaining for tube 20. Because the sheath 20 is of ductile material, and surrounds all of the compacted boride material, the elongated assembly may be bent, coiled, and subjected to other rigorous handling without likelihood of breakage or disturbance of its uniform composition per unit length. Uniformity of the composite "filler" member is important because it in turn affects uniformity of characteristics of the hard-facing produced with it. The composite member also promotes uses of wires which have been borided heavily, to give high percentages of boron in the hard-facing; such small wires, with only small cores of ductile metal remaining, would not lend themselves well to handling separately, whereas they may be assembled into sheathed composite arrangements under factory-controlled conditions quite readily.

When high concentration of boron is desired in an overlay, the "filler" member must supply it, and this requires that the filler member be boronized heavily. If a thick rod is used, the boriding must then be deep, and that is known to offer more difficulty than shallow boriding, especially in the case of a parent or base material such as molybdenum. In such instances, it is preferred to use smaller-diameter rods or wires, as to which even shallow boriding all around will then result in a greater percentage of boride to unreacted core.

The hardening which results from hard-facing overlay using a borided 0.035 inch diameter steel wire (1020 low-carbon steel) having 9.16% by weight of boron, is confirmed by testing of a specimen whose photographic enlargements appear in FIGS. 7 and 8. In FIG. 7, the low-carbon steel body (1018 steel) material 22, corresponding to body 11 in FIG. 1, is pictured at its interface, 23, with the hard-facing overlay material 24 in which boride particles are seen to be dispersed. The pointed indentations are the result of hardness testing, after the overlay 24 was produced in two passes with the borided steel wire as aforesaid. Knoop hardness testing, at 500 gram load, yielded average hardness of 652 KHN (Knoop Hardness), which converted to Rockwell average hardness of Rc 56. By way of comparison, an unborided 1020 steel wire of the same diameter yielded hardness measurement of 190 KHN, which is relatively soft, such that the improvement in hardness may be attributed to the borided wire. The FIG. 8 enlargement (490×, versus the 90× enlargement of FIG. 7) is of the overlay material 24, only.

In another two-pass overlay, made with a 0.035 inch 1020 steel "filler" member, the facing hardness proved to average Rockwell Rc 48 when the boron content was 5.19% by weight, with the rod being surface-diffused to exhibit the hard boride on its exterior, as in the case of rod 13.

A three-pass hard-facing of a 1018 steel body with a Chromel member, 0.040 inch in diameter and surface-diffused to have 3.28% by weight of boron, yielded a hardness measurement of Rc 44, whereas a like member, without boron, yielded an overlay which was quite soft. Similar three-pass hard-facings of a 1018 steel body with nickel-based members 0.035 inch in diameter yielded an overlay having a Rockwell hardness of Rc 5 when no boriding was involved, whereas 5.15% by weight of boron surface-diffused into the member to form a boride exterior yielded an Rc 51 hardness of facing. The said nickel-based member, offering good corrosion-resistant properties, was one involving about 2.5% cobalt, 1% chromium, 26–30% molybdenum, 4–6% iron, 1% silicon, 1% magnesium, and 0.05% carbon.

A higher-carbon steel rod (1095 steel) 1/16 inch in diameter, having 7.15% by weight of boron in the form of boride resulting from surface diffusion, used in a TIG three-pass hard-facing on a 1018 steel body, produced a very hard facing which tested as Rc 68.

It should be understood that preferred embodiments of the invention have been described and depicted for purposes of disclosure, rather than limitation, and that those skilled in the art may introduce various modifications, combinations and substitutions without departure from the spirit and scope of this invention as set forth in the appended claims.

What I claim as new and desire to secure by Letters Patent of the United States is:

1. The method of hard-facing which comprises boriding the exterior of an elongated ductile-metal element to less than its full cross-sectional depth and thereby forming an elongated composite member in which hard boride surrounds an elongated ductile core of unreacted metal, and feeding said composite member to the sites of surface-melting of a metal body by a welding torch and thereby melting said composite member and bonding the materials thereof as a layer of hard-facing metal on said body at said sites.

2. The method of hard-facing as set forth in claim 1 wherein said element is of metal selected from among the metals iron-base alloy, molybdenum, cobalt-base alloy nickel-based alloy and nickel-chromium alloy, wherein said elongated metal element is of substantially circular cross-section, and wherein the boron in said hard borides is a percent by weight of the composite member which is substantially the same as a desired percent by weight of the boron in said layer of hard-facing material.

3. The method of hard-facing as set forth in claim 1 which further includes forming a plurality of said elongated composite members, bundling the composite members together within a metal tube which is coextensive therewith, and mechanically working the tube with the members therein to reduce the cross-section thereof and force the hard boride into all spaces between the tube and the cores of the composite members, and thereafter feeding the composite members to said sites as parts of the mechanically-worked tube and members.

* * * * *